MECHANICALLY TIMED ELECTRICALLY OPERATED SWITCH MEANS

Filed Feb. 8, 1951 2 Sheets-Sheet 1

INVENTORS
HENRY W. FOSTER
ROBERT L. HALPERN
BY George C. Sullivan
Agent

MECHANICALLY TIMED ELECTRICALLY OPERATED SWITCH MEANS

Filed Feb. 8, 1951 2 Sheets-Sheet 2

INVENTORS
HENRY W. FOSTER
ROBERT L. HALPERN
BY
George Sullivan
Agent

Patented Sept. 22, 1953

2,653,200

UNITED STATES PATENT OFFICE 2,653,200

MECHANICALLY TIMED ELECTRICALLY OPERATED SWITCH MEANS

Henry W. Foster, Van Nuys, and Robert L. Halpern, Hollywood, Calif., assignors to Lockheed Aircraft Corporation, Burbank, Calif.

Application February 8, 1951, Serial No. 210,078

8 Claims. (Cl. 200—105)

This invention relates to devices for effecting sequential operations and relates more particularly to means for performing accurately timed sequential electrical operations.

In various applications and in connection with instrumentalities of widely different characters, it often becomes necessary to perform given sequences of operation with mutually independent electrical circuits and to accurately control or time the intervals between the operations of such sequences. The most common timing mechanisms for such purposes are synchronous electrical motors and mechanical escapement clock movements and where the intervals are in the micro-second region electronic timing devices with electronic switching means have proved most successful. However, when the time intervals between the sequential operations are to be in the region between approximately ten milliseconds and one second, the conventional present day equipment is not practical or adequate. The electronic equipment is excessively bulky, complicated, and is not dependable, particularly in the case of increased numbers of circuits and/or increased power requirements, and the mechanical escapements are difficult to design for the accurate timing of single cycles of operation.

It is a general object of the present invention to provide a simple, inexpensive, light-weight and compact device or means for producing an accurately timed electrical operation or for effecting a given or desired sequence of a plurality of accurately timed discrete electrical operations. The device of the invention may be termed, for the sake of simplicity, an intervalometer, it being understood that the invention is not to be considered as limited or restricted to any given use or application because of this present designation.

Another object of the invention is to provide an intervalometer of this character that is in the nature of an electro-mechanical means associated with a multi-position switch and electrical connections and components for the plurality of circuits to be controlled or energized.

Another and important object of the invention is to provide an intervalometer characterized by a transient accurate mechanical timer. In accordance with the invention, there is a spring driven ratchet shaft for operating a multi-position switch, or the like, the actuating spring serving to drive the shaft through the medium of a mechanism that utilizes the transient response of a mechanically vibrating system rather than the steady-state response of the system as conventionally employed in mechanical timers.

A further object of the invention is to provide an intervalometer mechanism of this character that may be adjusted to time the intervals over a substantial range, for example between approximately ten milliseconds and one second.

Other objects and features will become apparent from the following detailed description of a typical preferred embodiment of the invention throughout which reference will be made to the accompanying drawings wherein.

Figure 1:
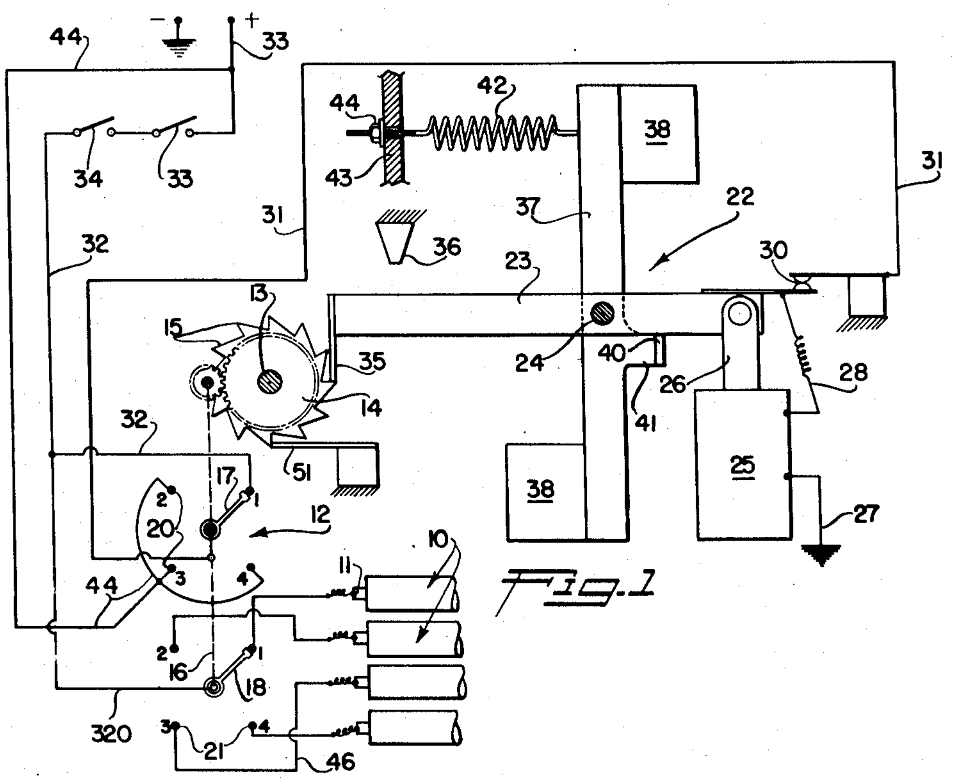
Figure 1 is a schematic or diagrammatic view of the device in the normal or unactuated position with the elements of the electrical circuits appearing in a wiring diagram.

In the simple embodiment and application of the invention illustrated in the drawings, there is a plurality of devices 10 to be energized or operated and these devices are in the nature of rockets having ignitor contacts 11, the details of the rockets and their firing devices or ignitors forming no part of the present invention except insofar as they constitute elements or devices to be energized or controlled. A multi-position switch 12 is connected in the circuits of the ignitors 11, as will be described below, and the switch in turn is operated by a shaft 13 carrying a ratchet wheel 14. The wheel 14 has a plurality of equally spaced teeth 15 of uniform size and a pawl 51 is arranged to cooperate with the teeth to prevent retrograde movement of the wheel and shaft 13. In the illustrative arrangement shown in the drawings, the ratchet shaft 13 drives the shaft 16 of the switch 12 in a manner to advance the switch contactors 17 and 18 one "step" with each advancement of the ratchet wheel 14. While the switch 12 is shown as a four-position two-bank switch, it is to be understood that the switch may have as many positions and as many banks of contacts as required for any particular installation. The contactor 17 is adapted to be moved or rotated between four equally spaced contacts 20 and the contactor 18 is adapted to be moved between four equally spaced contacts 21, the four corresponding contacts 20 and 21 being designated 1, 2, 3 and 4 in the drawings.

Figure 2:
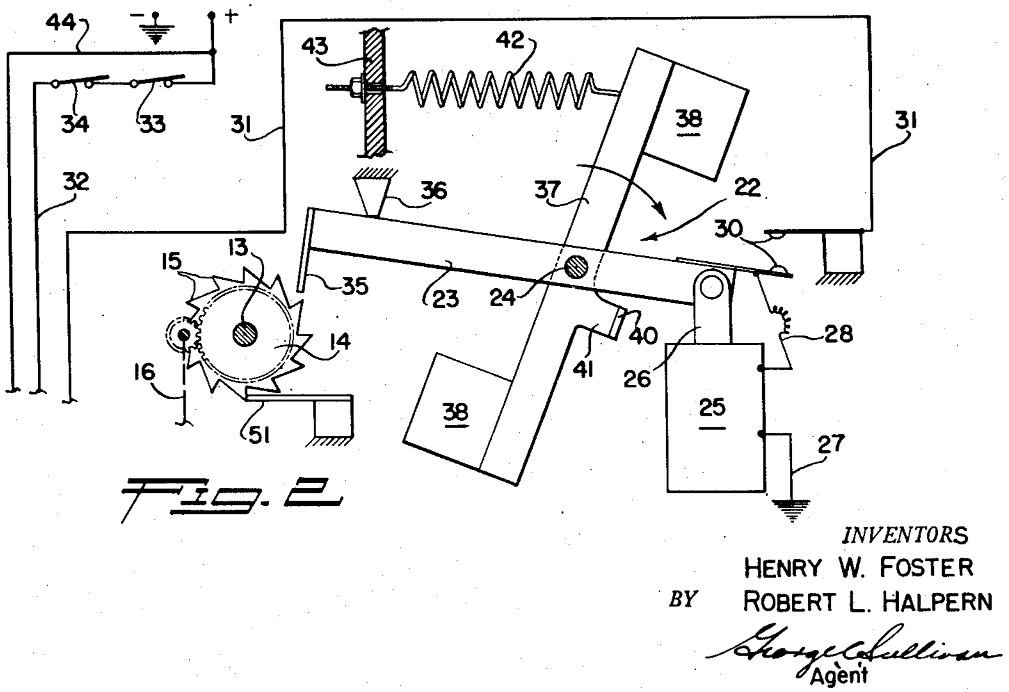
Figure 2 is a fragmentary view similar to Figure 1 showing the driving lever of the mechanical timer in an arrested actuated position and illustrating the timing lever continuing its movement.

The mechanical timer 22, which is a feature of the invention, includes what we will term a driving or actuating lever 23 supported on a hinge pin 24. The lever 23 is operated or rotated in one direction by a solenoid 25. While we have shown the armature 26 of the solenoid directly pivotally connected with an end of the lever 23, it will be apparent that the lever and solenoid may be associated in other manners. The solenoid 25 has one terminal grounded at 27 and a flexible lead 28 extends from the other terminal of the solenoid to one of a pair of contacts 30. Said contact 30 is carried by the actuating lever 23 and the other contact 30 is stationarily mounted. A lead 31 extends from the stationary contact 30 to the contactor 17 of the switch 12 and with the switch in its initial or unactuated position the contactor 17 is in engagement with the No. 1 contact 20. An energizing lead 32 extends from a suitable power source 33 to this No. 1 contact 20 and a pair of switches, which we shall term the arming switch 33 and the trigger switch 34 respectively, are interposed in the energizing lead 32. It will be seen that with the lever 23 in its static position of Figure 1 closing of both switches 33 and 34 will result in energization of the solenoid 25 and thus cause rotation or movement of the actuating lever 23. As viewed in the drawings, the solenoid 25 rotates the lever 23 in the clockwise direction. The end of the lever 23 has a driving pawl 35 for cooperating with the teeth 15 to turn the ratchet shaft 13 when the lever 23 is moved or rotated in the counter-clockwise direction. A stationary stop 36 is provided to limit rotation of the lever 23 in the clockwise direction. Figure 2 shows the actuating lever 23 in engagement with the stop 36 where its clockwise rotation has been arrested.

The mechanical timer 22 further includes what we will term a timing lever 37 pivoted or mounted on the hinge pin 34 for independent movement. Each arm of the lever 37 carries a weight 38, it being preferred that the lengths of the lever arms be equal and that the weights 38 be of the same mass and equi-distant from the axis of rotation of the lever. While the timing lever 37 is supported for movement independent of the actuating lever 23, it is provided with a lug 40 engageable with the lower edge of the actuating lever 23 at the right side of the shaft 24 as viewed in the drawings. The lug 40 serves to transmit rotation from the actuating lever 23 to the timing lever 37 when the actuating lever is rotated in the clockwise direction by the solenoid 25 and serves to transmit rotation from the timing lever 37 to the actuating lever 23 to move the latter in the counter-clockwise direction and thus advance the wheel 14 and shaft 13, as will be more fully described. In practice, the levers 23 and 37 may be supported on the pin 24 in adjacent relation and the lug 40 may project laterally or axially from a branch 41 of the lever 37 to be engageable with the lower edge of the actuating lever 23.

Spring means is associated with the timing lever 37 to receive and temporarily store the kinetic energy of the lever 37 as it moves in the counter-clockwise direction. This spring means may be in the form of a simple tension spring 42, having one end connected to an arm of the lever 37 and having its other end anchored to a stationary part 43. The spring 42 is arranged to be elongated or put under tension, or increased tension, when the lever 37 is rotated in the clockwise direction from its normal or static position of Figure 1. The anchored end of the spring 42 may be adjustably connected with the stationary part 38 so that timing of the cycle of operation of the timer 22 may be modified or adjusted, as will be more fully described. In the simple construction illustrated, a nut 44 is threaded on an end portion of the spring 42 and cooperates with or reacts against the part 43 to provide for this adjustment.

Figure 3:
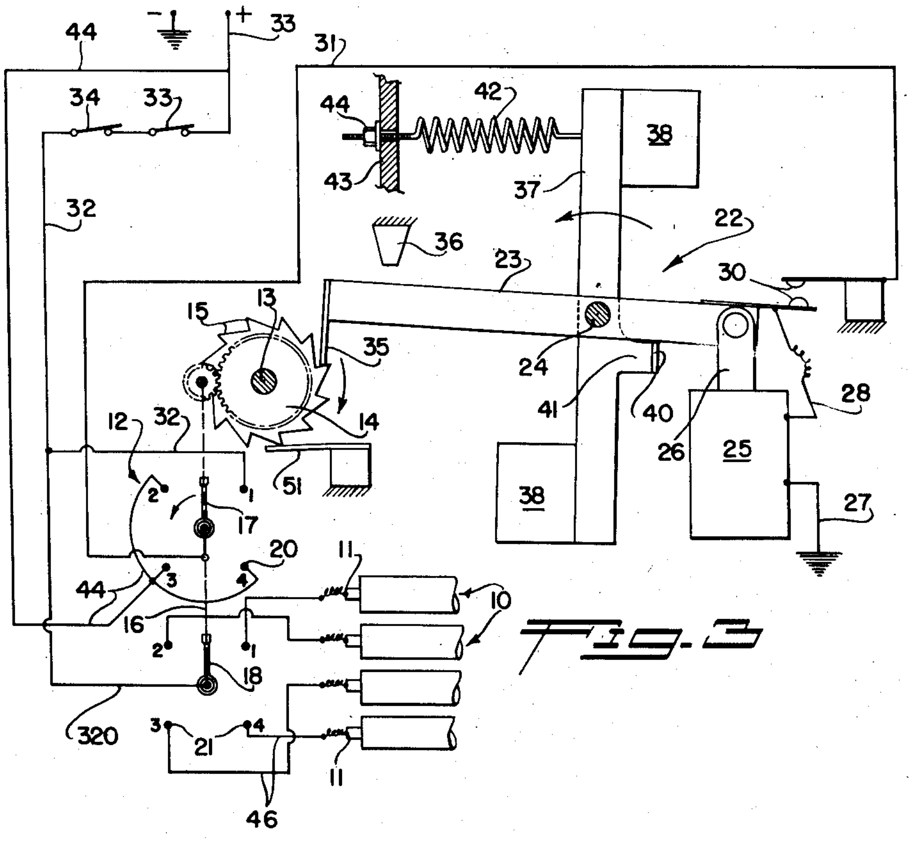
Figure 3 is a view similar to Figure 1 showing the levers during their return motions with the ratchet shaft being actuated thereby.

When the switches 33 and 34 are both closed to initiate operation of the device by the first or initial energization of the solenoid 25, the actuating lever 23 is rotated in the clockwise direction, as above described, and the lug 40 transmits this rotation to the timing lever 37. The clockwise motion of the actuating lever 23 is limited or arrested by the engagement of the lever with the stationary stop 36 but the timing lever 37, being unrestrained except for the spring 42, continues to rotate in the clockwise direction as illustrated in Figure 2 until all of the kinetic energy of the lever 37 and its weights 38 is stored in the spring 42. The lever 37 is then accelerated or rotated in the counter-clockwise direction by the force of the spring 42 and the lug 40 is again brought into engagement with the actuating lever 23 so that the latter is caused to move in the counter-clockwise direction together with the lever 37. Upon such motion or counter-clockwise rotation of the actuating lever 23, the pawl 35 cooperates with a tooth 15 to rotate or advance the ratchet shaft 13 and the switch shaft 16 one step, this action being illustrated in Figure 3. The return or counter-clockwise rotation of the actuating lever 23 also recloses the contacts 30 to re-energize the solenoid 25, assuming the solenoid circuit to be otherwise complete, and the cycle of operation is repeated.

Referring again to the switch 12, it will be seen that a branch 44 of the power lead 32 extends to and connects with the Nos. 2, 3 and 4 contacts 20 and is arranged in bypassing relation to the switches 33 and 34. Thus the first or initial operation of the timer 12 which moves the contactor 17 into engagement with the No. 2 contact 20 completes the circuit to the solenoid 25 to re-energize the same, the circuit being completed through the lead 44, contact 20, contactor 17 and lead 31 to the solenoid. This second energization of the solenoid 25 actuates the timer 22 for the second cycle which is identical with the cycle described above and which advances the contactor 17 to the No. 3 contact 20. The engagement of the contactor 17 with the No. 3 contact 20 again re-energizes the solenoid 25 and the timer 22 is re-cycled. In this manner the timer 22 repeats its operation or timing cycle until the contactor 17 is returned to the No. 1 contact 20.

As above described, the switch 12 may be constructed to control as many individual or related circuits as required in any given installation. In the simple diagrammatically illustrated form of the invention the switch 12 for four contacts 21 or banks of contacts 21 and leads 46 extend from these contacts to the ignitors 11 of the related rockets 10. The rockets 10 may be individual rockets or the leads 46 may each extend to pluralities of the rockets 10 so that the rockets may be fired in salvos. The contactor 18 of the switch 12 is energized by a branch 320 of the power lead 32 so that the rocket or rockets 10 connected with the No. 1 contact 21 are fired upon closing of the switches 33 and 34 and the rockets 10 connected with the Nos. 2, 3 and 4 contacts 21 are successively fired as the contactor 18 is advanced from one contact 21 to the other.

From the foregoing detailed description it will be seen that we have provided an extremely simple, inexpensive and thoroughly reliable intervalometer. The device may be constructed in the form of a small, light-weight and compact unit. The accurate operation of the timer may be designed so as to be substantially unaffected by temperature variations, vibration, constant accelerations or by its operating voltages as well as the voltages in the circuits being controlled, particularly well adapting the device for use on aircraft and the like. Furthermore, the device is readily adapted to time or control different numbers of circuits without major or substantial alterations.

It is to be particularly noted that the timer 22 utilizes the transient response for the timing of the intervals between each actuation of the switch 12 rather than utilizing the steady-state response of a mechanically vibrating system. The timing of the cycle of operation is determined primarily by the ratio of the spring constant of the spring 42 to the moment of inertia of the weighted timing lever 37. This may be varied or modified to adjust the interval between the successive actuations of the switch 12 by pre-loading the spring 42 instead of having the spring 42 free of tension when in the static condition or by changing the static loading or tension on the spring 42 to control or alter the duration of the vibratory cycle utilized to time the intervals. It will be seen that the circuit through the leads 32 and 320, the contactor 18 and the lead 46 is completed to fire the first rocket or rocket salvo immediately upon closing of the two switches 33 and 34. Thereafter, the other rockets 10, or salvos of rockets, are fired sequentially at accurately timed intervals, the intervals between the firing of each successive rocket or salvo being identical as determined or timed by the weighted timing lever 37 and spring 42 functioning as above described. Thus the first cycles after energization have exactly the same time intervals as the succeeding cycles, the device being transient accurate.

Having described only a typical form of the invention we do not wish to be limited to the specific details herein set forth, but wish to reserve to ourselves any variations or modifications that may appear to those skilled in the art and fall within the scope of the following claims.

We claim:

1. In combination, a multi-position switch having a contactor movable from position to position, a rotatable shaft for moving the contactor and carrying ratchet teeth, a first pivoted lever, electrically energized means for rotating the lever in one direction, means for positively arresting rotation of the lever in said direction, a pivoted timing lever, a lost motion connection between said levers transmitting motion from the first lever to the timing lever during rotation of the first lever in said direction and adapted to transmit motion from the timing lever to said first lever upon rotation of the timing lever in the opposite direction, the levers being independently pivotable so that the timing lever is free to continue to rotate in said direction after the motion of the first lever has been arrested by the second named means, spring means associated with the timing lever for storing the kinetic energy of said timing lever as the same rotates in said direction and operable to apply said energy to the timing lever to rotate the same in said opposite direction, and a pawl on said first lever cooperating with said teeth to rotate said shaft when the first lever is rotated in said opposite direction by said kinetic energy transmitted from the spring means.

2. A device of the character described comprising a multi-position switch having a shaft, ratchet means for rotating the shaft including a ratchet wheel, and a first pivoted lever having a pawl for cooperating with said ratchet wheel to rotate the shaft upon rotation of the lever in one direction, means energized by the switch for pivoting the first lever in the other direction, stop means for positively arresting movement of the first lever in said other direction, an independently pivoted timing lever, a connection for transmitting motion from the first lever to the timing lever upon rotation of the first lever in said other direction and for transmitting motion from the timing lever to the first lever upon rotation of the timing lever in said one direction, said connection being constructed and arranged to allow the timing lever to continue to rotate in said other direction after the movement of the first lever has been arrested by said stop means, and spring means for storing the kinetic energy of the timing lever while rotating in said other direction and for then applying said energy to the timing lever to move the same in said one direction so that said connection transmits movement therefrom to said first lever and its pawl to rotate said shaft.

3. A device of the character described comprising a multi-position switch having a shaft, ratchet means for rotating the shaft including a ratchet wheel, and a first pivoted lever having a pawl for cooperating with said ratchet wheel to rotate the shaft upon rotation of the lever in one direction, means energized by the switch for pivoting the first lever in the other direction, stop means for limiting pivotal movement of the first lever in said other direction, an independently pivoted timing lever, weights on the timing lever, a connection for transmitting motion from the first lever to the timing lever upon rotation of the first lever in said other direction and for transmitting motion from the timing lever to the first lever upon rotation of the timing lever in said one direction, said connection being constructed and arranged to allow the timing lever to continue to rotate in said other direction after the movement of the first lever has been arrested by said stop means, and spring means for storing the kinetic energy of the timing lever while rotating in said other direction and for then applying said energy to the timing lever to move the same in said one direction so that said connection transmits movement therefrom to said first lever and its pawl to rotate said shaft.

4. A device of the character described comprising a multi-position switch having a shaft, ratchet means for rotating the shaft including a ratchet wheel, and a first pivoted lever having a pawl for cooperating with said ratchet wheel to rotate the shaft upon rotation of the lever in a first direction, means energized by the switch for pivoting the first lever in the opposite direction, stop means for arresting pivotal movement of the first lever in said opposite direction, an independently pivoted timing lever, a connection for transmitting motion from the first lever to the timing lever upon rotation of the first lever in said opposite direction and for transmitting motion from the timing lever to the first lever upon rotation of the timing lever in said first direction, said connection being a lost motion connection to allow the timing lever to continue to move in said opposite direction after the stop means has arrested movement of the first lever, spring means for storing the kinetic energy of the timing lever while rotating in said opposite direction and for then restoring said energy to the timing lever to move the same in said first direction so that said connection transmits movement from the timing lever to said first lever and its pawl to rotate said shaft, and means for varying the spring constant of the spring means to regulate the interval between energization of the first named means and rotation of the shaft.

5. A device of the character described comprising a multi-position switch having a shaft, ratchet means for rotating the shaft including a ratchet wheel, and a first pivoted lever having a pawl for cooperating with said ratchet wheel to rotate the shaft upon rotation of the lever in a first direction, contact and solenoid means energized by the switch for pivoting the first lever in the other direction, stop means for limiting movement of the first lever in said other direction, an independently pivoted timing lever, a connection for transmitting motion from the first lever to the timing lever upon rotation of the first lever in said other direction and for transmitting motion from the timing lever to the first lever upon rotation of the timing lever in said first direction, said connection being of the lost motion type to allow the timing lever to continue to rotate in said other direction after the movement of said first lever has been stopped by the stop means, and spring means for storing the kinetic energy of the timing lever while rotating in said other direction and for then applying said energy to the timing lever to move the same in said first direction so that said connection operated to transmit movement to said first lever and its pawl to rotate said shaft.

6. A device of the character described comprising a multi-position switch having a shaft, ratchet means for rotating the shaft including a ratchet wheel, and a first pivoted lever having a pawl for cooperating with said ratchet wheel to rotate the shaft upon rotation of the lever in a first direction, means energized by the switch for pivoting the first lever in the other direction, stop means for limiting rotation of the first lever in said other direction, an independently pivoted weighted timing lever, a lug on the timing lever engaged by the first lever to transmit rotation therefrom to the timing lever upon rotation of the first lever in said other direction, the weighted lever continuing to rotate after the first lever is arrested by the stop means and the lug being operable to transmit rotation from the timing lever to the first lever upon rotation of the timing lever in said first direction, and a spring for storing the kinetic energy of the timing lever during rotation of the same in said other direction and operable to thereafter restore said energy to the timing lever to rotate the timing lever in said direction to actuate the switch shaft.

7. Means for sequentially energizing a plurality of electrically operated devices having energizing circuits, said means comprising first stationary contacts, a first movable contactor for successively cooperating with said first contacts, a series of second stationary contacts, a second movable contactor for successively cooperating with said second contacts, and a shaft for operating said contactors, solenoid means energized by said second contacts, and a transient accurate mechanical timer actuated by the solenoid means for successively rotating said shaft including a ratchet wheel on the shaft, a ratchet lever for cooperating with the wheel and actuated in a first direction by the solenoid means, stop means for positively limiting movement of the ratchet lever in said first direction, a weighted independently pivoted timing lever, spring means for storing the kinetic energy of the timing lever when rotated in said first direction and operable thereafter apply such stored energy to the timing lever to rotate the timing lever in said other direction, and a lost motion connection for transmitting movement from the ratchet lever to the timing lever when the ratchet lever is moved in said first direction, allowing the timing lever to continue to move in said first direction after the stop means has stopped the ratchet lever and thereafter operable to transmit movement from the timing lever to the ratchet lever when the timing lever is moved in said other direction by the spring means to thereby actuate said shaft.

8. Means for sequentially energizing a plurality of electrically operated devices having energizing circuits, said means comprising first stationary contacts, a first movable contactor for successively cooperating with the first stationary contacts, a series of second contacts, a second movable contactor for successively cooperating with said second contacts, and a shaft for operating said contactors, solenoid means energized by said second contacts, and a transient accurate mechanical timer actuated by the solenoid means for successively rotating said shaft including a ratchet wheel on the shaft, a ratchet lever for cooperating with the wheel and actuated in a first direction by the solenoid means, a weighted independently pivoted timing lever actuated in said first direction by the ratchet lever and operable when rotated in the other direction to rotate the ratchet lever to advance said shaft, spring means for storing the kinetic energy of the timing lever when rotated in said first direction and operable thereafter to rotate the timing lever in said other direction to actuate the shaft, and means for adjusting the spring constant of the spring means to vary the intervals between energization of the solenoid means and actuation of the shaft.

HENRY W. FOSTER.
ROBERT L. HALPERN.

References Cited in the file of this patent

UNITED STATES PATENTS

| Number | Name | Date |
|---|---|---|
| 853,888 | Leake | May 14, 1907 |
| 1,783,122 | Horlacher | Nov. 25, 1930 |
| 2,416,070 | Shively | Feb. 18, 1947 |

FOREIGN PATENTS

| Number | Country | Date |
|---|---|---|
| 294,729 | Germany | Apr. 2, 1917 |